Nov. 16, 1965     T. C. FURNAS, JR     3,218,458

DIFFRACTOMETER

Original Filed Feb. 29, 1960     6 Sheets-Sheet 1

INVENTOR

THOMAS C. FURNAS, JR.

BY WATTS, EDGERTON, PYLE, & FISHER

ATTORNEYS

Nov. 16, 1965  T. C. FURNAS, JR  3,218,458
DIFFRACTOMETER
Original Filed Feb. 29, 1960  6 Sheets-Sheet 4
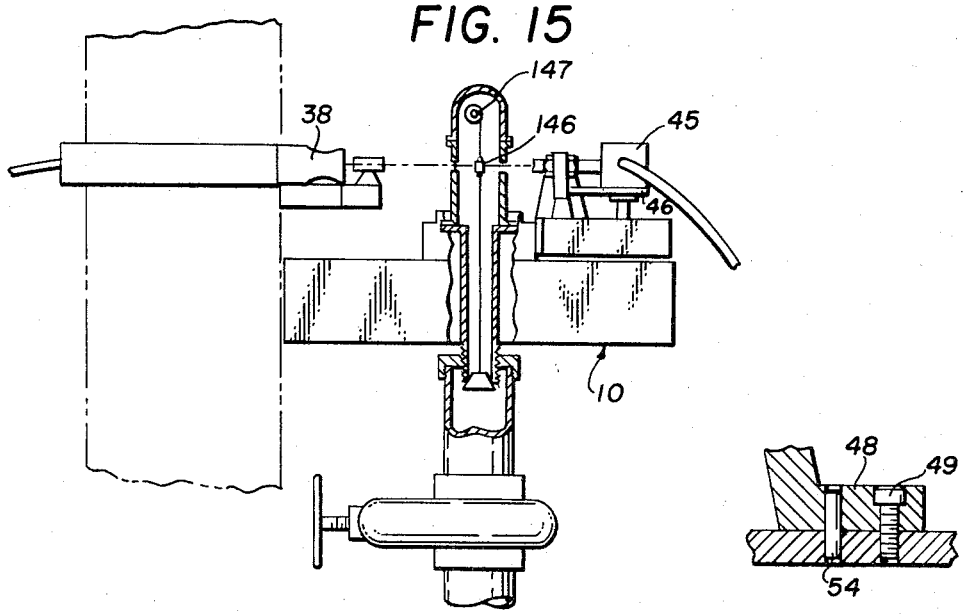
FIG. 15
FIG. 10
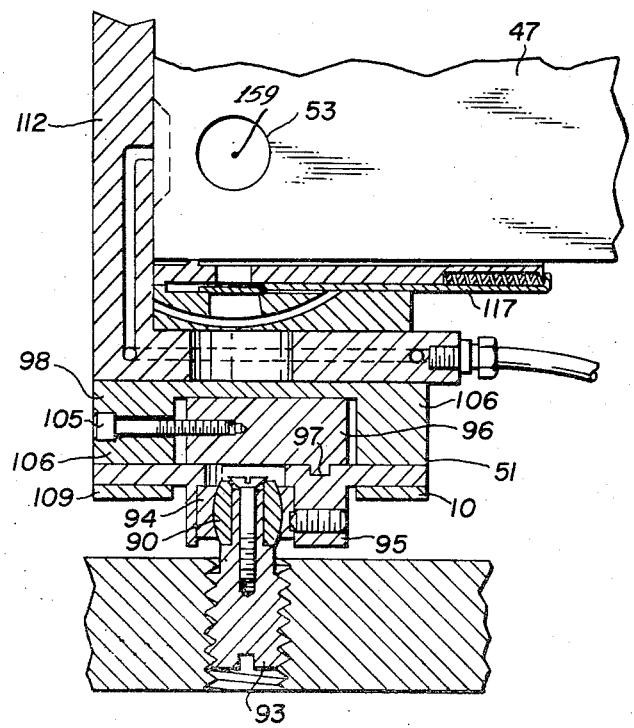
FIG. 9
INVENTOR.
THOMAS C. FURNAS, JR.
BY
WATTS, EDGERTON, PYLE, & FISHER
ATTORNEYS Nov. 16, 1965     T. C. FURNAS, JR     3,218,458
DIFFRACTOMETER
Original Filed Feb. 29, 1960     6 Sheets-Sheet 5
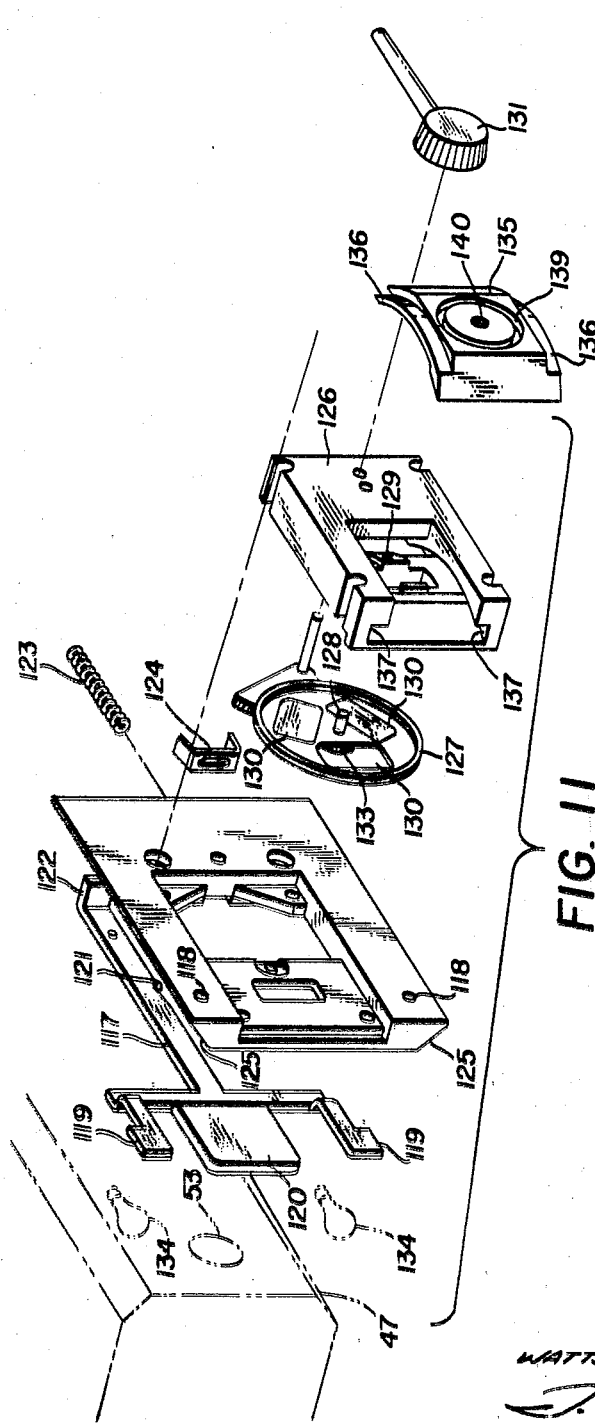
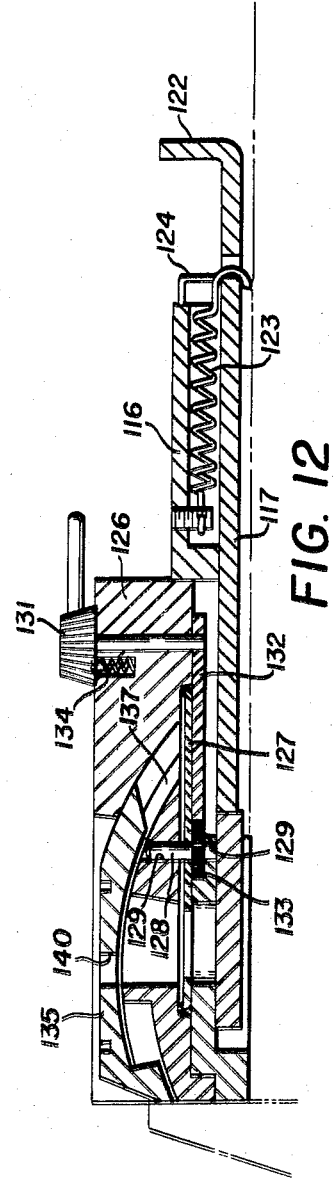
INVENTOR.
THOMAS C. FURNAS, JR.
BY
WATTS, EDGERTON, PYLE, & FISHER
ATTORNEYS Nov. 16, 1965  T. C. FURNAS, JR  3,218,458
DIFFRACTOMETER
Original Filed Feb. 29, 1960  6 Sheets-Sheet 6

INVENTOR.
THOMAS C. FURNAS, JR.
BY
WATTS, EDGERTON, PYLE, & FISHER

ATTORNEYS

United States Patent Office 3,218,458
Patented Nov. 16, 1965

3,218,458
DIFFRACTOMETER
Thomas C. Furnas, Jr., Cleveland Heights, Ohio, assignor to Picker X-Ray Corporation, Waite Manufacturing Division, Inc., Cleveland, Ohio, a corporation of Ohio
Continuation of abandoned application Ser. No. 12,492, Feb. 29, 1960. This application Nov. 2, 1962, Ser. No. 236,468
48 Claims. (Cl. 250—51.5)

This application is a continuation of my application Serial No. 12,492, filed February 29, 1960, now abandoned.

This invention pertains to a mechanism for non-destructive X-ray analysis and more particularly to that class of mechanisms usually known generically as diffractometers.

X-ray diffractometry and related arts, such as X-ray spectography, are now well-established scientific techniques. Through the art of diffractometry it is possible to analyze a specimen as to chemical content, as to physical properties and characteristics and as to spacial distribution and location of atoms and molecules without destroying that specimen. The usual technique is to position a specimen on a rotatable support. An X-ray tube is positioned in spaced relationship with the specimen and the specimen is irradiated by a suitably collimated beam of X-rays. The specimen will diffract the rays into a pattern which is characteristic to the specimen such that this pattern will, to the experienced observer, reveal these mentioned chemical and physical properties and characteristics, and through mathematical computations the mentioned spacial distribution can be determined.

One of the arts related to diffractometry utilizes what are known as diffraction cameras. With a diffraction camera a film is positioned around the specimen and a photograph of diffracted rays is obtained. A diffractometer on the other hand is usually considered to encompass a mechanism wherein the diffracted rays are measured by a suitable detector, such as a scintillometer.

The detector is positioned on a suitable suport which is rotatable relative to both the specimen and the X-ray tube. The detector is positioned, prior to the start of a study, in the path along which X-rays will be diffracted from the specimen. The specimen will then be rotated, often back and forth, through an angle variously referred to as theta or as omega. The theta angle is the angle between the X-ray beam and a diffraction plane of a crystal under study. The diffracted rays will also be at an angle theta with this plane. The omega angle is the angle between the normal to a given reference plane in the specimen and the diffraction vector or bisector of the angle between the incident and the diffracted X-ray beams. As the specimen is rotated through an angle, theta, the detector must be rotated twice as rapidly through an angle, two-theta, to maintain its position in the path of the diffracted rays. Accordingly, the detector is usually supported on a suport which is known as the two-theta support.

Many prior proposals have been made for mechanisms to conduct the described studies. These mechanisms have been limited in their use. Normally, prior mechanisms have been designed for operation about only a vertical or only a horizontal axis of specimen rotation, not both.

The present mechanism is especially designed to be used either with its axis vertical or horizontal.

Few, if any, of these prior mechanisms have permitted both right and left handed use. By this it is meant, positioning the X-ray tube selectively on either side of the specimen. The present mechanism is designed to be assembled in either the right or left handed version. This feature of the mechanism facilitates the pairing of two mechanisms for simultaneous use with the same X-ray tube.

The design of prior mechanisms has been such that the X-ray tube is not supported directly by the mechanism but instead the tube is primarily supported by a separate support. This method of support of the X-ray tube generally results in difficult alignment procedures. In addition, thermal variations of the mechanism and X-ray tube support produce misalignment of the mechanism.

In the present mechanism the X-ray tube is usually supported entirely by the mechanism thus eliminating the difficulty of alignment and the possibility of misalignment caused by thermal expansion of a separate tube support.

Prior mechanisms have not provided a means for changing what is known as the take off angle of the target without disturbing the precise alignment of the mechanism. This take off angle is the angle of the plane of the X-ray tube makes to the line of the selected X-ray beam. The present mechanism provides for micrometer adjustment of take off angle through a suitable range of, for example, from zero to ten degrees, without affecting the precise alignment of the mechanism.

Further, the construction of prior mechanisms has made the conduction of some studies extremely difficult and made other studies practically impossible. For example, the X-ray study of a given specimen while it is under stress in a tensile machine has been so impracticable with prior mechanisms that only the most elementary and rudimentary attempts at such an examination have been possible. Positioning a suitable furnace along the axis of rotation of a diffractometer to study a specimen while it is heated to very high temperature has produced equal if not greater difficulties.

In same types of studies, such as with a furnace, or a stressed object, it is desirable to put the specimen in fixed position relative to the base of the diffractometer and other mechanisms. The X-ray tube and detector must then both be rotated about the specimen. With prior mechanisms this type of study was essentially impossible to perform since these mechanisms have required the rotation of the specimen on their central axis and the rotation thereabout (a) usually of the detector while the X-ray tube is fixed relative to the diffractometer base, (b) occasionally of the X-ray tube while the detector is held fixed (c) but not of both the X-ray tube and the detector simultaneously.

The new and improved X-ray tube support, a novel power train and a new and improved support of the rotatable elements all coact to permit these listed and other advantages to be obtained. Whereas most prior mechanism envelop a permanently coupled 2:1 gear drive to accomplish the theta and two theta motion, the present mechanism provides a novel bearing structure which affords a greater applicability in use than prior known mechanisms.

This structure is a rugged sleeve bearing comprised primarily of three parts. An inside hollow sleeve is fixed to the diffractometer frame. Two concentric sleeves fit over the inside sleeve in such a manner that both of the outside sleeves are independently rotatable. One worm gear is attached to each of these sleeves so that they can be worm driven.

It is apparent that these two sleeves can be driven in a number of ways to produce any desired angular positioning of specimen, detector and X-ray source. With this arrangement a wide variety of studies are obtainable. The usual diffractometer arrangement may be set up in which the X-ray tube is mounted in a fixed position in space; the specimen rotates at an angular velocity theta; the detecor is synchronized to rotate at an angular velocity two-theta. In this version, the specimen would be positioned in the inside rotatable sleeve while the detector would be attached by an apron to the outside sleeve.

As another example, the specimen may be moved independently while the detector and X-ray tube are fixed in place. This motion herein being referred to as the omega motion. The omega motion is necessary and desirable, for example for producing rocking curves of crystals and various specimen.

As a third example, the one motor may be driven in reverse while the other motor is also driven to hold the specimen stationary in space and rotate the detector.

As another example, a 1:1 gearing at the two worm drives may be used to move both the inside and outside rotating sleeves at equal angular velocities so that by fixing the specimen on the fixed sleeve, the X-ray tube on the outside sleeve, the detector on the inside rotatable sleeve; one can effect another motion. This arrangement is not available in prior mechanism. This fourth motion is used for the study of such phenomena as diffraction from a liquid surface and diffraction of specimens being treated in such cumbersome devices as earlier mentioned furnaces and tensile mechanisms.

While the described structure permits this wide variety of motion, it also has the advantage of permitting the center of the bearing structure to be completely open and free. This open center allows a wide latitude in the type of studies which can be conducted. For example, the mentioned furnace and tensile studies can be performed with the furnace or tensile specimen positioned in a fixed relationship relative to the diffractometer frame and extending right through the center of the bearing structure. Additionally, vacuum pumps and other apparatus may be brought through the diffractometer base from the side opposite the X-ray tube, detector and the like so as to afford complete freedom in conducting a study while using any desired type of mechanism in conjunction with that study.

In order to conduct simultaneous studies with the same X-ray tube it is necessary to pair diffractometers.

The improved diffractometer can be paired with a comparable mechanism for either horizontal or vertical operation. When this diffractometer is paired for operation with horizontal axes the two diffractometers can be in either side-by-side or face-to-face relationship. With prior known mechanisms only the face-to-face relationship has been possible.

Another of the features of the new mechanism is that the entire gear train is mounted in a removable unit. This removable unit is selectively insertable within the diffractometer frame for connection with the sleeves. Through this technique a simplified manufacturing technique is obtained. Either, very highly accurate power trains or less accurate trains suitable for most studies may be mounted selectively one at a time within the same diffractometer mechanism. A suitable power train may be selected and inserted in the diffractometer housing to provide a gear train of any desired degree of accuracy and gear ratio. Further, repair and maintenance is greatly simplified since the entire power train can be removed and another substituted upon mechanical failure of the train.

With prior arrangements, it has been difficult to prevent "scatter" radiation from leaking out at such places as where the collimator is connected to the housing of the X-ray tube. In addition, it has not been possible to connect a collimator to an X-ray tube while the tube was in operation to conduct, for example, a study through a second collimator.

These disadvantages are overcome by the present invention in that a simplified and improved adjustable support for the X-ray tube has been devised. In addition, a simplified and improved shutter window has been devised which permits a collimator to be connected to and aligned with an X-ray tube housing though the tube may be in operation for the conduction of another study.

Another advantage of this device is that removable position indicators are provided. The structure is constructed such that the indicators can be connected to the power train in any of a plurality of selected positions to place these indicators in a convenient location for any of the wide varieties of types of studies that can be conducted.

A more specific advantage of the invention is that separate clutches are provided in the power train so that one can selectively move, either manually or under power, either of the two rotatable sleeves to position the sleeves properly in a desired orientation relative to one another.

Other objects and a fuller understanding of the invention may be had by referring to the following description and claims taken in conjunction with the accompanying drawings, in which:

FIGURE 9 is an enlarged sectional view of the novel X-ray tube anode alignment mechanism as seen from the plane indicated by the line 9—9 of FIGURE 1;

FIGURE 10 is an enlarged fragmentary sectional view of the connection of the X-ray tube anode support bracket to the housing;

FIGURE 11 is an exploded view of the novel and improved shutter mechanism;

FIGURE 12 is a sectional view of the shutter mechanism;

Figure 1:
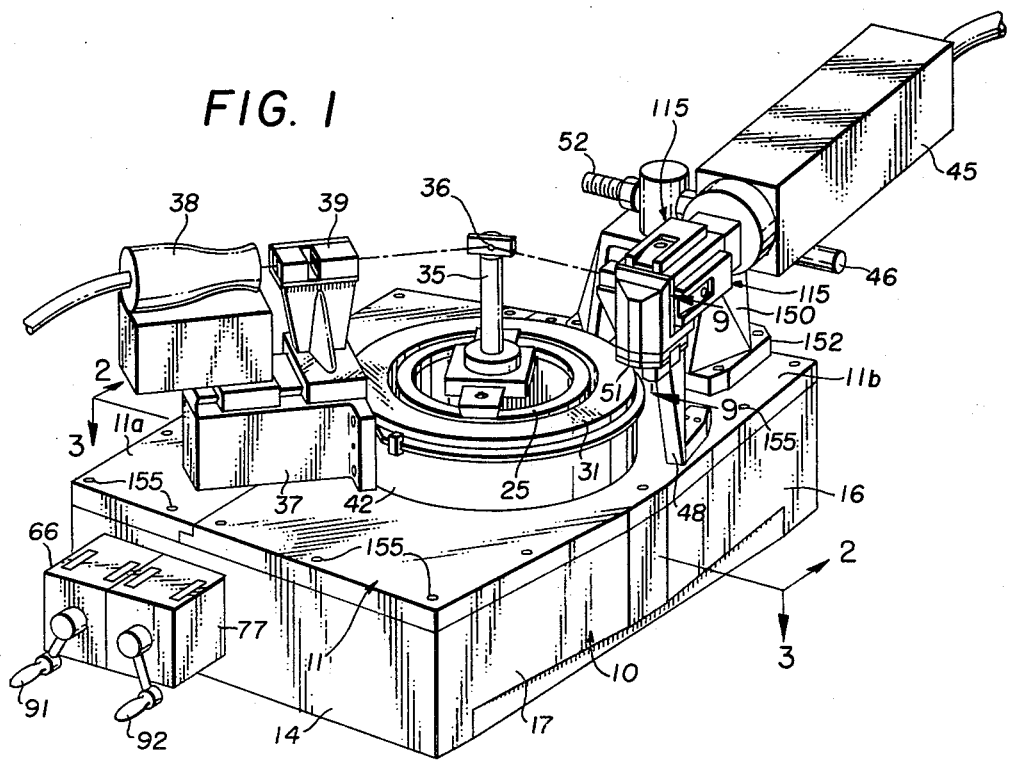
FIGURE 1 is a perspective view of one of the novel and improved diffractometers.

Referring now to the drawings, a diffractometer housing is shown generally at 10. The housing 10 includes upper and lower walls 11, 12 which are spaced and parallel. The upper wall 11 is in two sections 11a and 11b, FIGURE 1. These sections, and the parts connected to them, are each removable for reasons which will be described in detail below. The housing 10 also includes spaced non-parallel end walls 13, 14. The lower wall 12 and the end walls 13, 14 are each base or support walls which may support the diffractometer and which may carry leveling screws upon which the diffractometer may be positioned.

The housing 10 also has a side wall 15 which extends from one end wall to the other and intersects each at approximately an equal angle. The majority of the other side of the housing is defined by a pair of non-parallel side wall portions 16, 17 each of which terminates at one of the end walls. The side wall portion 16 terminates at the end wall 13 and is normal to it. The side wall portion 17 terminates at the end wall 14 and is normal to it. The side wall portion 16, 17 are abutment surfaces which may serve to properly locate a pair of the housings 10 when two diffractometers are paired in a fashion similar to that shown in FIGURE 13. Analysis of the drawings and of the foregoing description will show that in the preferred and disclosed arrangement, the entire housing 10 is symmetrical about a plane which perpendicularly bisects the upper and lower walls 11, 12 and the side wall 15.

Omega and two theta motions

Figure 2:
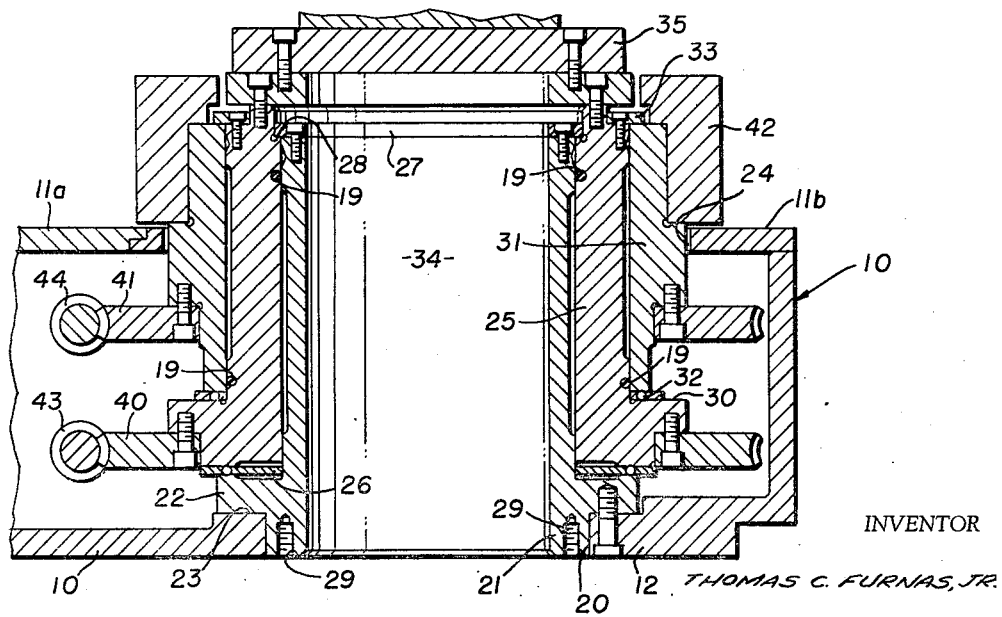
FIGURE 2 is a sectional view of the novel and improved bearing and support structure as seen from the plane indicated by the line 2—2 of FIGURE 1 and on an enlarged scale with respect to FIGURE 1.

The lower wall 12 has the aperture 20 formed through it. An annular support member 21 projects into the lower wall aperture 20, FIGURE 2. The annular support has a peripherally extending annular flange 22 which rests on an inner surface 23 of the lower wall 12. The annular support 21 is secured to the lower wall 12. The support 21 projects axially through an aperture 24 formed in the upper wall.

An inner or middle sleeve 25 is journaled on the outer surface of the support 21. A thrust bearing 26 is interposed between the base of the inner sleeve 25 and the annular flange or shoulder 22 of the support 21. A retaining ring 27 is secured to the top of support 21 and overlies a shoulder 28 formed on the sleeve 25 to secure the sleeve and support 21 together in axially fixed relationship.

The inner sleeve has a radially projecting annular flange 30 projecting outwardly therefrom near the lower end. A second and outer sleeve 31 is journaled on the periphery of the inner sleeve 25. A thrust bearing 32 is positioned between the lower end of the outer sleeve 31 and the inner sleeve flange 30. An outer sleeve retaining ring 33 is secured to the top end of the inner sleeve 25 and overlies the outer sleeve 31 to secure the two sleeves together in axially fixed relationship. The support 20 and the sleeves 25, 31 are coaxially disposed with their common axis disposed in the described plane of symmetry. O rings 19 are interposed between the support 21 and the inner sleeve and between the sleeves 25, 31.

This described journaling relationship of the two sleeves 25, 31 and the support 21 provides one of the outstanding advantages of this invention. The described structure permits the support 21 to have the very large passage 34 formed through it. This passage, or aperture, 34 greatly facilitates the conduction of diffraction studies since it may be used to permit a wide variety of studies such as those shown in FIGURES 14 and 15. Still other studies are greatly facilitated through the provision of tapped holes 29 in the base of support 21. Such accessory devices as a vacuum pump may be connected to the base of the diffractometer for a wide variety of other studies to be conducted without the accessories limiting the range of the diffractometer in any way.

The middle or inner sleeve 25 may be referred to as the omega sleeve and it is sometimes referred to as the theta sleeve. The omega sleeve may have a specimen support 35 to it. As indicated in FIGURE 1, among others, a specimen shown at 36 is carried by the support.

The outer sleeve 31 is what may be referred to as a two-theta sleeve. This two-theta sleeve 31 carries a support mounting ring 42. A radially projecting support arm 37 is attached to the support mounting ring 42. A detector 38 may be connected to the support arm 37. The usual mechanism known as a Soller Slit 39 may also be mounted on the support arm 37.

Annular sleeve drive gears 40, 41 are connected to the inner and outer sleeves 25, 31, respectively. The drive gears 40, 41 may be identified respectively as the omega and two-theta gears. Omega and two-theta worms 43, 44, engage the gears 40, 41, respectively. The engagement of the worms 43, 44 with the gears 40, 41 and the driving of the worms 43, 44 will be described in greater detail below.

Tube support and adjustment

An X-ray tube housing 45 is adjustably and removably carried by the main housing 10. The tube housing 45 is preferably rectangular. One surface of the housing 45 rests on a housing support bar 46. The support bar 46 is fixed to a generally U-shaped bracket 150, FIGURES 1 and 13. The bracket 150 is removably secured to one of the removable sections 11b, of the housing wall 11. The bracket is retained in place by screws 152, FIGURE 1. The X-ray tube has a square end 47 of reduced cross-sectional area. One face of the square end 47 is pivotally connected to a Z-shaped bracket 48. As is best seen in FIGURE 10, the Z-shaped bracket 48 is removably connected to the housing 10 by threading screws 49 into tapped holes 50 which are provided in the upper section 11b. Dowel pins 54 provide locating indicia for the bracket 48 on the section 11b.

Figure 8:
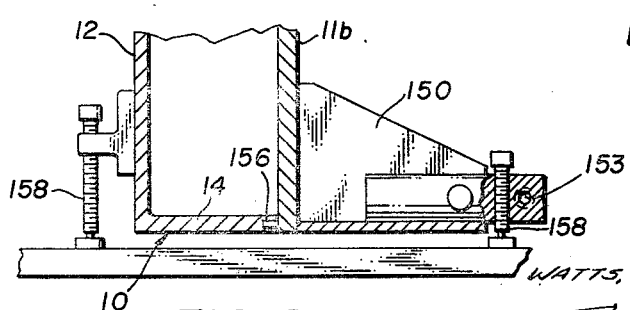
FIGURE 8 is a fragmentary sectional view as seen from the plane indicated by the line 8—8 of FIGURE 13 showing two of the adjustable feet for leveling the diffractometer when it is positioned on one of its ends.

At the upper end of the bracket a novel and improved swivel adjustment connection 51 is provided. The details of construction of the swivel connection 51 will be described with greater clarity below. The swivel connection 51 serves as a pivot for the X-ray tube 47 and housing 45 which rests on the bar 46. A pivot adjustment screw 52 is threaded into a threaded hole 153, FIGURE 8, in the tube bracket 150 to adjustably pivot the X-ray tube housing 45 about the pivot provided by 51. Through this adjustment the angular alignment of the focal spot 159 of the X-ray tube anode and the specimen is obtained.

As has been indicated, one of the advantages of this unit is that the unit may be operated as either a left or a right hand diffractometer. This selection can be obtained by removing the tube brackets 48 and 150 and placing them on the opposite end of the housing. With such a change, however, realignment of the tube with the upper wall section 11b is required. This realignment is avoided by the simple expedient of removing one upper wall section 11b and the connected tube and bracket as a unit, for example, the righthand arrangement shown in FIGURE 1, and substituting another upper wall section with another tube and bracket connected as the other hand, such as the lefthand arrangement shown at the left in FIGURE 13. Suitable screws 155, FIGURE 1, and dowels 156, one shown in FIGURE 8, may be provided to facilitate this substitution.

Figure 7:
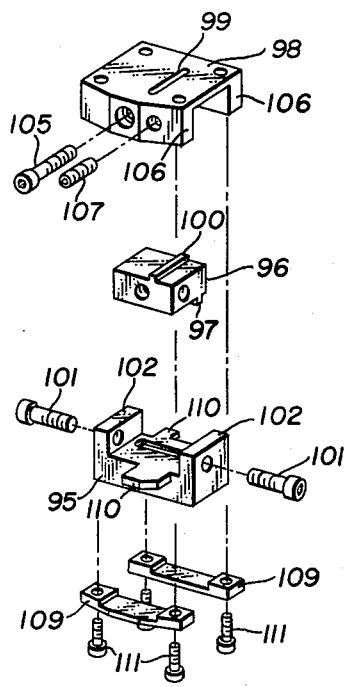
FIGURE 7 is an exploded view of the novel and improved pivotal support connection for an X-ray tube.

Referring now to FIGURES 7 and 9, a novel adjusting support of the X-ray tube anode end is shown. A sphere segment 90 is secured to a vertical adjustment screw 93 which is threaded into the tube support bracket 48. An annular spherical bearing member 94, having a surface which co-acts with the sphere segment 90, is secured to a base adjustment member 95. A central adjustment member 96, having a tongue 97 disposed in a complemented groove in the base adjustment member 95, is also provided. A top adjustment member 98 straddles the central adjustment member 97. The top adjustment member 98 has a groove 99 which receives the co-acting tongue 100 on the central adjustment member 96.

Adjustment screws 101 pass through apertures in side flanges 102 on the base adjustment member 95 and thread into the central adjustment member 96. Rotation of the adjustment screws 101 will cause the central adjustment member and the top adjustment member to shift lineally relative to the base member along the path defined by the base member engaging tongue 97 and its co-acting groove.

An adjustment screw 105 passes through an aperture in one of flanges 106 of the top adjustment member. The adjustment screw 105 threads into the central adjustment member to cause adjustment of the top member relative to the central and base members along the path defined by tongue and groove 100, 99. A set screw 107 threads into another aperture in the same one of the flanges 106 to co-act with the adjustment screw 105 on obtaining and cking this adjustment of the top member relative to the ntral and base members.

Spring clamp members 109 are connected to the flanges 16 of the top adjustment member. The spring clamp embers 109 straddle ears 110 on the base adjustment ember. Tightening of screws 111 which connect the ring clamp members 109 into member holding engageent with the ears 110.

The top adjustment member 98 is secured to an X-ray be anode cooling jacket 112 which in turn is fixed to e anode end 47 of the X-ray tube.

Drive elements

One of the unique features of this diffractometer is that e entire motor and gear arrangement is an integral unit rried within the housing 10. This unit includes a secidary housing or frame 55 which is removably mounted ithin the housing or frame 10. The top wall section 11b removable to permit access to the secondary housing 5 and to permit removal of the drive assembly as a unit.

Figure 4:
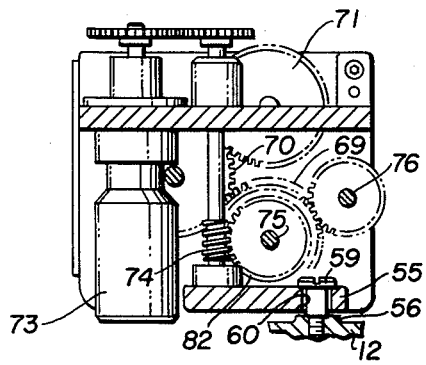
FIGURE 4 is a sectional view of a portion of the removable supplemental housing and power train, a drive motor, and the connection for joining the removable supplemental gear housing to the main housing.
Figure 6:
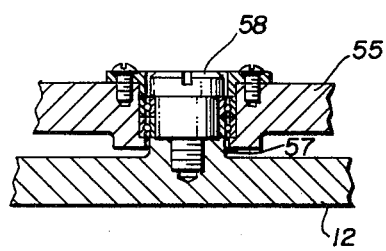
FIGURE 6 is a sectional view of the pivotal support for the supplemental gear housing as seen the plane indicated by the line 6—6 of FIGURE 3.

The secondary housing 55 rests on a pair of locating ops 56, 57, FIGURES 4 and 6, respectively, which are rmed in the housing lower wall 12. The secondary using 55 is bearinged on a removable pivot 58 which threaded into the locating projection 57. The second-y housing 55 loosely fits over a locating stop 59 which threaded into the locating projection 56. Within a nge delimited by the size of aperture 60 through which le locating stop 50 projects, the secondary housing 55 is votal about the pivot 58. A spring 61 is interposed tween the main and secondary housings 10, 55 and rge the secondary housing 55 inwardly about the pivot 3. This inward urging by the spring 61 maintains the ngagement between the omega and two-theta drive orms 43, 44 and the omega and two-theta gears 40, 41, spectively.

Figure 3:
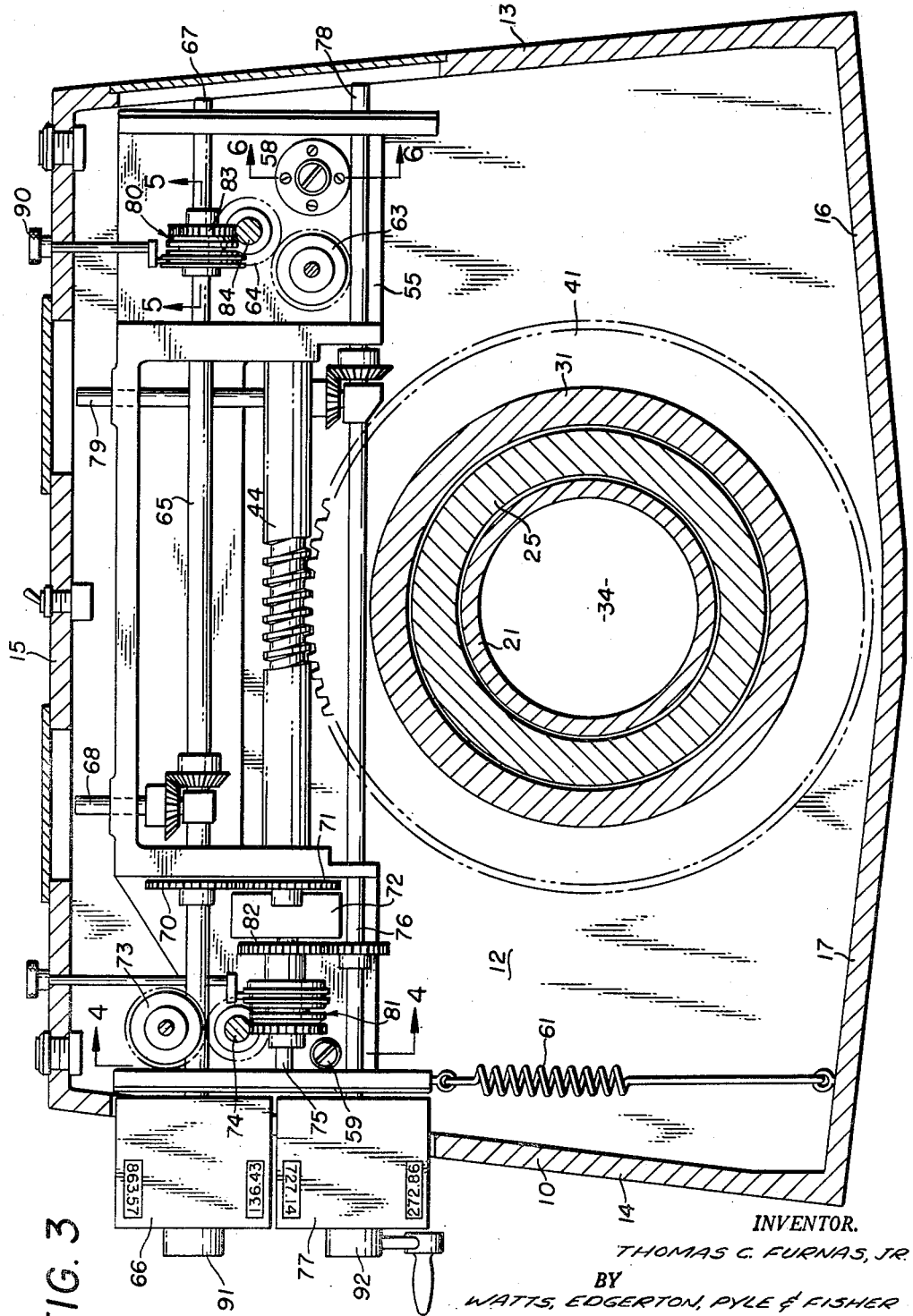
FIGURE 3 is a sectional view of the device as seen from the plane indicated by the line 3—3 of FIGURE 1 and on an enlarged scale with respect to FIGURE 1.

A main drive motor 63 is provided. The main drive otor is connected, through a suitable gear train desigated at 64, to a drive shaft 65. The drive shaft 65 exnds the entire length of the secondary housing 55. The rive shaft 65 projects from the opposite ends of the ousing to permit an indicator knob 66 to be removably cured to the shaft at lefthand side of the drawing as nown in FIGURE 3 or to shaft end 67 projecting from e opposite end of the housing, the right as seen in IGURE 3. A side wall indicator shaft 68 is also proided which projects toward an opening in the side wall 5. Thus, the indicator may be selectively positioned adcent a selected one of the end walls 13, 14 or the side all 15.

A pinion gear 70 is secured to the drive shaft 65. The inion gear 70 engages and drives a two-theta pinion ear 71 which is secured to and drives the two-theta worm 4. A differential 72 is provided which has a first end ear 69 positioned immediately below the two-theta gear 1 and visible in FIGURE 4. The 1st end gear 69 is riven by the pinion gear 70. The planetary of the difrential 72 is secured to the omega worm 43 to drive it t one-half the speed of the two-theta worm 44 when e main drive motor 63 is operating and a second difrential end gear 82 is locked. It should be noted that or clarity of illustration in FIGURE 4 the differential end ears 69, 82 are shown of different size but they may, in ractice, be of identical size.

A specimen drive motor 73 is provided. The specimen rive motor is connected through suitable gearing 74 to specimen drive shaft 75. The specimen drive shaft 75 connected to the differential 72 and to a specimen posion indicating shaft 76.

During normal operation either the main drive motor 3 or the specimen drive motor 73 is used. Normally, the vo motors are not operated at the same time. Therere, if the main drive motor is operating the specimen rive gear train 74 serves as a brake to lock one side of e differential 72 and cause the half speed motion of the omega worm 43. If the specimen drive motor 73 is operating and the main drive motor 63 is idle, the main drive gearing 64 serves as a brake to hold the main drive shaft 65 and directly connected two-theta worm 44 motionless. Thus, all of the motion provided by the specimen drive motor 73 is utilized to cause the specimen or omega worm 43 and any connected indicators to rotate.

The indicator shaft 76 like the main drive shaft 65, extends through the length of the supplemental housing 55 and projects from both ends thereof. A specimen indicator 77 is removably connected to one end of the specimen shaft 76 just as an indicator 66 is removably connected to one end of the drive shaft 65. The specimen shaft 76 has an opposite end 78 which may, like the end 67 of the shaft 65, receive an indicator. In addition, a side wall specimen indicator shaft 79 is provided to operate in a fashion comparable to the side wall indicator shaft 68.

Manual positioning

To facilitate set up of a study, clutches are provided which permit the worms 43, 44 to be selectively and manually positioned relatively quickly. The manual positioning is obtained by rotating a selected one of a pair of hand cranks 91, 92 secured to the indicators 66, 77, respectively.

A main drive clutch shown generally at 80 is connected to the main drive shaft 65 and is interposed between main drive gear train 64 and the pinion 70. A comparable specimen drive clutch 81 is connected to the specimen drive shaft 75 and is interposed between the specimen drive gear train 74 and the differential end gear 82. The clutches 80, 81 are identical in construction and therefore only the details of clutch 80 will be described in detail.

A worm wheel 83 is driven by a worm 84 which forms a part of the main drive gear train 64. The worm wheel 83 is fixed to a worm drive member 85 which is journaled on the main drive shaft 65. The worm drive member 85 and the worm wheel 83 rest against the thrust washer 86 which is carried by the main drive shaft 65 and secured against axial movement relative to the shaft.

Figure 5:
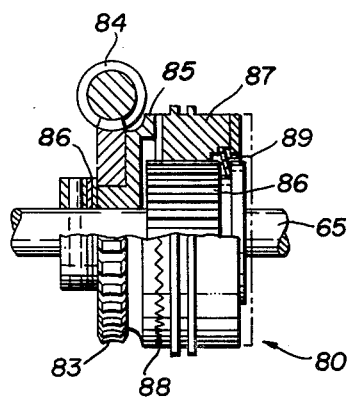
FIGURE 5 is a sectional view of the improved clutch employed in this mechanism as seen from the plane indicated by the line 5—5 of FIGURE 3.

A spline 86 is fixed to the main drive shaft 65. An annular internal gear member 87 is engaged with the spline and axially movable relative to the spline and the shaft 65. The annular gear member 87 and the worm drive member 85 have coacting radially disposed teeth at 88 which prevent relative rotation of the two when engaged. A Belleville spring 89 is interposed between the annular gear member and the spline and projects into annular grooves in each. When the members are in the position shown in FIGURE 5 the clutch is engaged and rotation of the worm 84 will drive the shaft 65. Manipulation of clutch control member 90, FIGURE 3, will shift the annular gear member 87 axially to the right as seen in FIGURE 5 and snap the Belleville spring 89 over center until the spring urges the gear member in a direction away from engagement with the drive member 85. This is the position shown in phantom in FIGURE 5. When the clutch is disengaged the shaft 65 may be rotated manually for quick adjustment positioning of the mechanism. The specimen clutch 81 serves a similar function.

The clutch provides one of the outstanding advantages of the invention in that simple, quick and positive gear engagement is obtained without any end play or other disadvantages which might affect the accuracy of the gear train. More important, no torque load or friction is imposed on the system and therefore the high accuracy of the mechanism is not affected by the presence of the clutches.

X-ray tube shutter

In FIGURES 11 and 12 the details of the novel and improved window shutter assembly shown generally at 115 in FIGURE 1 and other of the drawings are shown. The assembly 115 includes a shutter retaining mounting plate 116 which is fixed to one face of the anode end 47 of the X-ray tube housing. A shutter member 117 is mounted in the mounting plate 116 for rectilinear movement.

The mounting plate has a pair of light emitting holes 118 near the top. The shutter 117 includes a pair of light blocking arms 119 and an X-ray window cover plate or shutter 120. The shutter member 117 also has a downwardly extending arm. The shutter arm has a notch 121 in its side and a control tab 122 at its end remote from the shutter 120. A spring 123 is interposed between the shutter and the mounting plate 116 normally urging the shutter member into a closed position. When the shutter member is in a closed position the shutter 120 is positioned across the tube window 53 to block the emission of X-rays. The light blocking arms 119 are positioned across the light apertures 118 to prevent the emission of light through the apertures when the shutter member is closed.

The shutter member may be opened manually to facilitate setting up the diffractometer for study. When the shutter member is manually opened a latch 124 may be slid manually to engage the notch 121. This notch-latch engagement holds the shutter member in an opened position exposing both the X-ray window and the light aperture 118. When the diffractometer is in use in a study, the shutter is normally held open by a solenoid, not shown. Preferably the solenoid is in a timer circuit, a circuit used to operate a scaler so that the shutter will automatically close at the conclusion of a study. The shutter will also close automatically if there is a power failure.

Lights 114 are provided and positioned in line with the apertures 118 and behind the arms 119. The lights 114 are turned on when the main power of the X-ray generator is turned on. Thus, before the X-ray tube is turned on, the operator will have a visual indication through apertures 118 as to whether or not a shutter member is open.

The mounting plate 116 is chamfered on either side at 125. With this construction, four such mounting plates may be mounted against the respective faces of the square end 47 of an X-ray tube. When so mounted the mounting plates completely surround the tube end 47. Each light 114 is mounted at a corner of the X-ray tube end 47 and may be seen through one of the apertures 118 in each of two of the mounting plates 116.

A filter retainer is secured to the mounting plate 116. A filter wheel 127 has a shaft 128 which projects into suitable openings 129 in the plates 116, 126. The filter wheel 127 has, in the preferred and disclosed embodiment, three filter windows 130 which carry suitable X-ray filter elements. Rotative adjustment of the filter wheel is obtained by a handled rotating knob 131 which is connected to a gear segment 132. The gear segment 132 engages a pinion 133 which is mounted on the filter wheel shaft 128. A detent 134 is carried by the filter retainer plate 126 to locate the filter wheel in a selected one of three positions with a filter 130 aligned with the X-ray beam.

A collimator connecting plate 135 is carried by the filter retainer plate 126. The collimator connector plate has oppositely directed tongues 136, each of which is accurately curved. The tongues 136 loosely fit in complemental arcuately curved grooves 137 formed in the filter adaptor plate 126. An annular recess 139 circumscribes an X-ray window 140 in the collimator connecting plate 135. The collimator plate 135 may be shifted up and down about the axis of the arcuately curved tongues 136 and may be rocked sidewise due to the loose fit of the tongue 136 and the grooves 137. This permits proper collimator alignment with the X-ray tube focal spot while the X-ray tube is turned on without any danger of scatter radiation or other hazards.

*Special applications*

Figure 13:
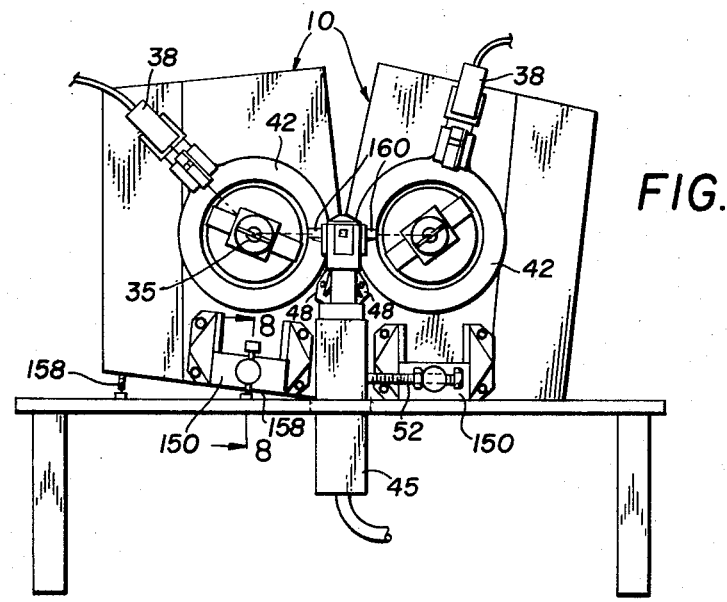
FIGURE 13 is a side elevational view showing a pair of diffractometers positioned for the simultaneous conduction of a pair of studies.
Figure 14:
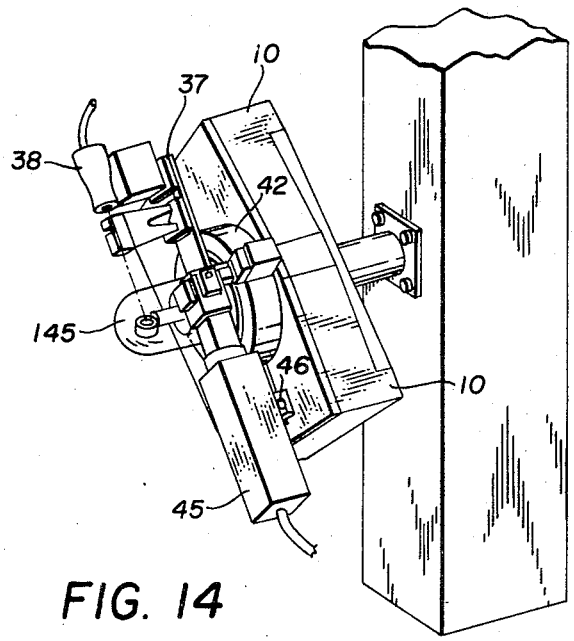
FIGURE 14 is a perspective view of the device showing a vacuum furnace arrangement connected thereto; and, FIGURE 15 is a side elevational view of the device showing an application for the study of radioactive materials.

In FIGURES 13, 14 and 15, three applications of the novel and improved diffractometer of this invention are shown to emphasize the advantages of the various features which have been described. In FIGURE 13 two diffractometers are positioned side by side to operate with a single X-ray tube. The tube is supported by the right hand diffractometer which simply rests on a side wall. The left diffractometer is leveled on screws 158. The tube support bracket 150 is retained in place on the left hand diffractometer to support one of the leveling screws. The tube normally supported by the diffractometer at the left in FIGURE 13 and the connected tube adjustment screw 52 have been removed to facilitate alignment with the tube supported by the diffractometer at the right of the drawing. The alignment of the left diffractometer with the X-ray tube and the connection of a collimator 160 are greatly facilitated by the described novel and improved X-ray shutter arrangement. Further, this alignment and connection may, for the first time, be accomplished safely while the tube is in use.

Another advantage of this unit which will be apparent from a study of FIGURE 13 is that a diffraction camera may be mounted directly on the tube in alignment with a third tube window. Thus, a third study may be set up and conducted while the two diffractometer studies are in progress.

In FIGURE 14 the device is shown hung from a wall with a specimen housed within a cover 145 which may be evacuated. This drawing emphasizes the advantages of the novel and improved bearing arrangement, which, among other advantages, permits movement of the specimen and detector, or if desired X-ray tube and detector relative to one another and a fixed specimen as shown in FIGURE 14, or movement of specimen and tube relative to one another and a fixed detector as shown in FIGURE 15. The bearing arrangement also permits a very high vacuum to be obtained without in any way interfering with the operation of the device or limiting the range of rotation of the specimen, detector and/or tube.

In FIGURE 15 the novel and improved bearing arrangement is used to different advantage by permitting a radioactive specimen 146 to be brought from a storage position, not shown, by a simplified elevator arrangement 147. With this arrangement dangerous specimen such as radioactive material can be studied while keeping the diffractometer operator completely safe from exposure to the substance.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a non-destructive X-ray analyzing device the combination of, a support housing having first and second spaced walls, each of said walls having a support aperture, the apertures being in alignment, a tubular bearing support secured to the housing first wall in axial alignment with the first wall aperture, first and second tubular sleeves, said sleeves and support being telescoped together in bearinged relatively rotatable relationship, said sleeves and support together forming an object supporting body projecting through said second wall aperture, and power train means carried in the housing and in operative engagement with each of the sleeves to rotate the sleeves relative to one another and relative to the support whereby said sleeves form rotatable members for supporting objects and devices used in non-destructive X-ray analyses.

2. The device of claim 1 wherein the first wall is a lower support wall and wherein the housing has a second support wall parallel with the axis of the sleeves and normal to the lower support wall.

3. In a non-destructive X-ray analyzing device having a frame member with a lower wall, the device being positionable with a selected one of the walls, the combination of, an upper wall opposite the lower wall, the upper and lower walls each having an aperture therein, an annular support secured to the lower wall in axial alignment with the lower wall aperture and projecting through the upper wall aperture, a first sleeve telescoped over the support in a snug bearinged fit for relative rotation therewith, a second sleeve telescoped over the first sleeve in a snug bearinged fit and rotatable relative to the first sleeve and relative to the support, means operably connected to each of the sleeves and to the support to maintain the sleeves and the support in axially fixed relationship, and drive means disposed between the spaced walls and carried by the frame in operative engagement with each of the sleeves to rotate the sleeves relative to one another and relative to the support whereby said sleeves for rotatable members for supporting objects and devices used in none destructive X-ray analyses.

4. The device of claim 3 wherein a co-acting X-ray study element is connected to the frame in a fixed relative position and disposed at least in part within the interior of said annular support.

5. The device of claim 3 wherein the means maintaining the sleeves and support in a fixed axial position relatively includes a first thrust bearing interposed between the first sleeve and the support and a second thrust bearing interposed between the first and second sleeves.

6. The device of claim 3 wherein the drive means includes first and second annular gears secured to the first and second sleeves respectively, first and second worms engaging the first and second gears respectively, and resilient means connected to the frame and urging the worms into engagement with the gears.

7. In a non-destructive X-ray analyzing device, the improvement which comprises a frame structure having a base wall and a spaced wall, each of the walls having a through aperture formed therein, the apertures being in axial alignment, said base wall having an alignment surface defining the peripheral extremity of said base wall aperture, said base wall having an inner support surface on its side nearest said spaced wall, a tubular support positioned in the frame and projecting through both of the wall apertures, said support being in aligning abutment with said alignment surface, said support including an external, laterally extending flange in abutment with said laterally extending base support surface, said support and frame being secured together against relative movement, said support including a rotatable sleeve support portion extending from said flange to the support end remote from said base, said sleeve support position including journal bearing cylindrical surfaces formed on the peripheral extremities thereof, said flange including a thrust bearing surface adjacent said rotatable drive support portion and extending laterally therefrom, a first rotatable sleeve telescoped over said projection, a thrust bearing interposed between the first sleeve and said flange thrust bearing surface, a stop member secured to the remote end of the support and overlapping the first rotatable sleeve to prevent relative axial movement between the support and the first rotatable sleeve, said first rotatable sleeve including an external radially extending support flange in the lower portion thereof, a first rotatable sleeve including a second rotatable sleeve support portion extending from said flange to the end remote from said base, said second sleeve support portion including cylindrically contoured journal bearing portion defining peripheral extremities thereof, a second tubular rotatable sleeve telescoped over the first, a thrust bearing interposed between the first sleeve flange and the second sleeve, and a stop member fixed to the remote end of the first sleeve and overlapping the second to prevent relative axial movement between the two.

8. In a non-destructive X-ray analyzing device having a frame member with a lower support wall and spaced end support walls, the device being poistionable with a selected one of the support walls as a base wall, the combination of an upper wall opposite the lower wall, the upper and lower walls each having an aperture therein, an annular support secured to the lower wall in axial alignment with the lower wall aperture and projecting through the upper wall aperture, a first sleeve telescoped over the support in a snug bearinged fit for relative rotation therewith, a second sleeve telescoped over the first sleeve in a snug bearinged fit and rotatable relative to the first sleeve and relative to the support, means connected to the sleeves and the support to maintain the sleeves and the support in axially fixed relationship, an annular mounting member telescoped over the sleeves and fixed to the second sleeve for rotation therewith, said mounting member extending radially outwardly from said second sleeve and overlying said upper wall aperture, said mounting member being disposed on a side of said upper wall opposite said lower wall, the mounting member including a generally radially projecting detector mounting arm, and drive means disposed between the spaced walls and carried by the frame in opertaive engagement with each of the sleeves to rotate the first sleeve and the mounting member fixed to the first sleeve relative the second sleeve and to rotate the sleeves relative to the support.

9. In a non-destructive X-ray analyzing device the combination of, a principal housing, a pair of relatively rotatable sleeve-like support members journaled in the principal housing, each of said sleeve-like support members including a driven gear means, a secondary housing removably secured to the principal housing, said housings including complemental locating surfaces abuttable to orient said housings into a selected relative position, connection means fixing the housings together with said locating surfaces in abutment with one another, a gear train carried by said secondary housing and in driving connection with each of said driven gear means, and power means connected to one of the housings and in driving connection with said gear train.

10. The device of claim 9 wherein said gear train includes at least one indicator control shaft accessible through an aperture in a wall of the principal housing.

11. The device of claim 9 wherein the secondary housing is disposed within the principal housing.

12. The device of claim 9 wherein a biasing means is interposed between the housings to maintain the driving connection between the gear train and the driven gear means.

13. In a non-destructive X-ray analyzing device the combination of a housing, specimen and detector support means carried by the housing for rotation about an axis, said housing being symmetrical about a plane passing through said axis, the housing having first and second spaced non-parallel end walls generally paralleling said axis and symmetrically disposed on either side of said plane, a first side wall extending from one end to the other transverse to said plane of symmetry, the housing also having a second side wall including first and second locating surfaces, the first locating surface being normal to the first end wall and on the same side of the plane of symmetry as the first end wall, and the second locating surface being normal to the second end wall and on the same side of the plane of symmetry as the second end wall.

14. In a non-destructive X-ray analyzing device the combination of a housing, specimen and detector support means carried by the housing for rotation about an axis, said housing including a first supporting base disposed substantially normal to said axis, the housing including second and third spaced supporting side bases paralleling said axis and normal to said first supporting base, said second and third supporting side bases being non-parallel, each of said supporting bases being configured to support said device, and at least one of said supporting side bases including adjustable leveling leg means for supporting said device when such one supporting side base is in device supporting use, whereby to provide a device in which one of the three supporting bases may be selected to provide a base for the device to place said axis in either a horizontal or a vertical position.

15. In combination, a pair of non-destructive X-ray analyzing mechanisms relatively positioned on a support, a multi-windowed X-ray tube secured to one of the mechanisms, each of said mechanisms including first and second sleeves rotatable with respect to one another and to the tube, a pair of specimens each secured to one of the second sleeves, tube adjustment means interposed between the tube and said one mechanism to adjustably align a beam of X-rays transmitted through one of said windows with the specimen secured to the second sleeve of said one detector, and adjustment means interposed between the other mechanism and the support to align the other of the specimens with a beam of X-rays transmitted from another of said tube windows.

16. In a non-destructive X-ray analyzing device including a housing and X-ray tube, the combination of a tube support secured to the housing and to the tube, said support comprising: a base, a segment of a sphere secured to the base, a first adjustable member swivelably secured to the sphere segment, a second adjustable member secured to the first and movable in a rectilinear path of adjustment relative to the first member, a third adjustable member fixed to the tube and secured to the second member, the third member being movable along a second rectilinear path of adjustment relative to the first and second members and transverse to the first rectilinear path, a first adjustment means secured to the first and second members to cause selective relative adjustment thereof along the first path, and a second adjustment means secured to the second and third members to cause selective relative adjustment thereof along the second path.

17. The device of claim 16 wherein the first and second members include a coacting tongue and groove and the second and third members include a coacting tongue and groove, each such tongue and groove defining one of said paths and wherein each of said adjustment means comprises a screw carried by one member and in threaded engagement with another.

18. In a non-destructive X-ray analyzing device having a housing and first and second rotatable members journaled in the housing, first and second motor elements, and first and second shaft elements connecting the first and second motor elements to the first and second rotatable members respectively, and combination of, first and second clutches interposed between the first motor element and the first member and the second motor element and the second member respectively and connected to the first and second shaft elements respectively, each of said clutches comprising, a spline secured to one of the elements of one member, a slidable member mounted on the spline and having an internal gear engaged with the spline for slidable movement therealong, the slidable member and the spline each having an annular groove formed therein, a Belleville spring interposed between the spline and the slidable member and projecting into the grooves, an engageable member connected to the other of the elements of the same member, said slidable member having a first position abutting said engageable member, the slidable member and the engageable member having coacting surfaces interlocking the two to prevent relative rotation when the slidable member is in said first position in engagement with the engageable member, said slidable member having disengaged second position, and means connected to the slidable member to selectively shift the member from the engaged first position to the disengaged second position and return.

19. The device of claim 18 wherein said coacting surfaces each have a plurality of radially disposed teeth.

20. In a non-destructive X-ray analyzing mechanism including relatively rotatable theta and two-theta members mounted in a housing, the combination of:
 (a) a housed X-ray tube adapted to emit a beam of X-rays;
 (b) support means mounting the tube on the housing and fixing it to the housing;
 (c) said support means including adjustment means to adjust the position of the tube relative to the housing and to align the beam of X-rays emitted by the tube with an object carried by at least one of the relatively rotatable theta and two-theta members; and,
 (d) said support means holding said tube and housing together to prevent relative independent movement from an adjusted position.

21. In a non-destructive X-ray analyzing mechanism including relatively rotatable theta and two-theta members mounted in a housing, the combination of:
 (a) a housed X-ray tube adapted to emit a beam of X-rays;
 (b) first and second spaced supports securing the tube and housing together;
 (c) said first support including a pivot connection; and,
 (d) said second support including means to rotate the tube about the axis of the pivot connection.

22. The device of claim 21 wherein said pivot connection includes a spherical bearing.

23. The device of claim 21 wherein the first support includes means to adjust translation of the tube relative to the mechanism housing.

24. The device of claim 21 wherein said first support includes a first means to adjust the position of the tube relative to the housing along a path transverse to the axis of the pivot connection, and a second means to adjust the position of the tube relative to the housing along a path transverse to both the axis of the pivot connection and the first path of adjustment.

25. In a non-destructive X-ray analyzing mechanism having first and second support members journaled in a housing for relative angular rotation, a drive system for selectively motivating the support members at predetermined angular velocities, said drive system comprising:
 (a) first and second power means mounted in the housing;
 (b) a first drive means connecting the first power means to the first support member;
 (c) a second drive means connecting the second power means to the second support member;
 (d) means interconnecting said first and second drive means so that angular rotation of the support members is obtained by selective operation of one or both of said power means whereby a first relative support member movement is obtained by the selective operation of one of said power means and a second different relative support member movement is obtained by the selective operation of both of said power means.

26. In a non-destructive analyzing mechanism having first and second support members journaled in the housing for rotation, the combination of:
 (a) first and second power means mounted in the housing;
 (b) a first drive train connecting the first power means to the first member;
 (c) a second drive train connecting the second power means to the second member;

(d) said second drive train including a differential; and, (e) said first drive train being connected to the differential to provide an X-ray analyzing mechanism in which support member rotation is obtained by selective operation of one or both power means.

27. The device of claim 26 wherein each drive train includes an actuatable clutch to permit selective disengagement of the power means and positioning of the members when the power means are disengaged.

28. The device of claim 27 wherein the power means are electric motors.

29. The device of claim 26 wherein at least one drive train includes a worm and worm gear between its power means and the differential with the worm connected to its power means and acting as a brake when its power means is not operating.

30. A non-destructive X-ray analyzing mechanism comprising:
   (a) a housing;
   (b) first and second relatively rotatable support sleeves provided in the housing;
   (c) first and second worm gears secured to the first and second support sleeves respectively;
   (d) first and second worms meshed with the first and second gears respectively;
   (e) first and second motors in the housing and operatively connected to the first and second worms respectively;
   (f) a differential operatively connected to and between the first motor and the first worm gear; and,
   (g) the second motor being operatively connected to the differential.

31. In a non-destructive X-ray analyzing mechanism having first and second support members journaled in a housing for relative rotation of devices attached to the support members, a drive system for selectively motivating the support members at predetermined angular velocities, said drive system comprising:
   (a) first and second power means mounted in the housing;
   (b) a first drive train connecting the first power means to the first member;
   (c) a second drive train connecting the second power means to the second support member;
   (d) said second drive train including a differential, said differential having first and second end gears and a planetary gear operatively driven by said first and second end gears;
   (e) said second power means motivating said second member through the first end gear and the planetary gear of the differential;
   (f) said first drive train being operatively connected to said second end gear and motivating said second support member through the second end gear and the planetary gear of the differential, whereby said first and second support members are rotated relatively by the operation of one or both of the power means and the other of the power means acts as a brake when only one such power means is operative.

32. In a non-destructive X-ray analyzing mechanism having first and second support members journaled in a housing for relative rotation of devices attached to the support members, a drive system for selectively motivating said support members at predetermined relative angular velocities, said drive system comprising:
   (a) first and second worm gears secured to the first and second support members respectively;
   (b) first and second worms meshed with the first and second worm gears respectively;
   (c) first and second motors mounted in said housing;
   (d) first and second drive means operatively connecting said first and second motors to said first and second worms, respectively;
   (e) said second drive means including a differential;
   (f) said differential having first and second end gears and a planetary gear operatively driven by said first and second end gears;
   (g) said second motor motivating said second worm through the first end gear and the planetary gear of the differential;
   (h) said first drive means being operatively connected to said second end gear and motivating said second worm through the second end gear and the planetary gear of the differential, whereby said first and second support members are rotated by the operation of one or both of the motors and the other motor acts as a brake when only one such motor is operative.

33. In a non-destructive X-ray analyzing mechanism having support members journaled in a primary housing for relative rotation, a drive mechanism for motivating the rotatable support members, said driving mechanism comprising:
   (a) driven gear means secured to each of the support members;
   (b) a secondary housing removably secured to said primary housing;
   (c) a gear train carried in said secondary housing and connectable with each of said driven gear means;
   (d) said housings including complemental locating surfaces abuttable to orient housings into a selected relative position where said gear train carried by said secondary housing is in driving connection with each of said driven gear means; and,
   (e) connection means releasably fixing the housings together with said locating surfaces in abutment with one another.

34. A non-destructive X-ray analyzing mechanism comprising:
   (a) a base;
   (b) support members rotatably mounted on said base and being relatively rotatable;
   (c) an X-ray tube supported by a tube housing;
   (d) support means being connected to said base and said tube housing and mounting said tube housing on said base and adjacent said rotatable support members;
   (e) said tube housing having an X-ray pervious opening adjacent the focal spot of the X-ray tube and facing toward said rotatable support members; and,
   (f) said support means being connected to said tube housing near the focal spot of said X-ray tube so that expansion of said X-ray tube and tube housing does not move the focal spot relative to said base.

35. The device of claim 34 including, in combination:
   (g) said support means including adjustment means to adjust translation of the X-ray tube relative to the base.

36. The device of claim 35 wherein said adjustment means adjusts tangential and radial translation of the X-ray tube relative to the axis of rotation of said support members.

37. The device of claim 34 including, in combination:
   (g) said support means including adjustment means to adjust the spacing between said X-ray tube and said base.

38. A non-destructive X-ray analyzing mechanism comprising:
   (a) a base;
   (b) support members rotatably mounted on said base and being relatively rotatable;
   (c) an X-ray tube supported by a tube housing;
   (d) support means being connected to said base and said tube housing and mounting said tube housing on said base and adjacent said rotatable support members;
   (e) said tube housing having an X-ray pervious opening adjacent the focal spot of the X-ray tube and facing toward said rotatable support members; and, (f) said support means being connected to said housing by a rotatable connection located near said X-ray pervious opening so that said X-ray tube is angularly movable relative to said base and rotatable substantially about the focal spot of the tube.

39. The device of claim 38 including, in combination:
(g) adjustment means carried by said base spaced from said support means and abutting said X-ray tube to adjust the angular position of said X-ray tube relative to said base.

40. A non-destructive X-ray analyzing mechanism comprising:
(a) a base;
(b) support members rotatably mounted on said base and being relatively rotatable;
(c) an X-ray tube supported by a tube housing;
(d) a pair of spaced tube supports mounting said tube housing on said base and adjacent said rotatable support members;
(e) said tube housing having an X-ray pervious opening adjacent the focal spot of the X-ray tube and facing toward said rotatable support members; and,
(f) one of said tube supports supporting said tube housing near the focal spot of the X-ray tube and the other of said tube supports supporting the tube housing spaced from the focal spot of the X-ray tube.

41. The device of claim 40 wherein at least one of said tube supports is adjustable to adjust the angular position of the X-ray tube axis relative to said base.

42. The device of claim 40 wherein said one tube support is connected to the tube housing and the tube housing is slidably supported by said other tube support so that expansive movement of said tube and tube housing is relative to said other tube support and not to said one tube support.

43. A non-destructive X-ray analyzing mechanism comprising:
(a) a mechanism housing;
(b) first and second support members rotatably mounted on said housing for relative angular rotation, each of said support members being rotatable relative to said housing;
(c) driving means connected to said support members for rotating said support members in said housing at a predetermined relative angular rotation;
(d) clutch means interposed between said driving means and at least one of said support members, said clutch means being actuatable to disconnect said one support member; and,
(e) an adjustment member carried by said housing and connected to said one support member for selectively adjusting the angular position of said one support member by rotating said support member relative to said base when said clutch means is actuated to disconnect said one support member from said driving means.

44. The combination of claim 43 wherein said clutch means is interposed between the driving means and both said support members, and a second adjustment member is carried by the housing and is connected to the other support member for selectively adjusting the angular positions of the support members relative to each other and to the housing.

45. A non-destructive X-ray analyzing device, a plurality of which may be positioned side-by-side for simultaneously conducting a plurality of X-ray studies from a single X-ray tube mounted on one of the devices:
(a) each device comprising:
(i) a housing having upper and lower face walls and at least four side walls;
(ii) said side walls including spaced, non-parallel end walls substantially normal to the lower face wall, said end walls being symmetrically disposed about a plane of symmetry; and,
(iii) said housing including first and second mounting means disposed symmetrically on opposite sides of the plane;
(b) bracket means connectable to said first and second mounting means of one of said devices selectively one at a time and being connected to one of said mounting means;
(c) an X-ray tube mounted on said bracket means and adjustably secured against movement relative to the bracket means when a selected one of said end walls and lower face is the housing base of said one device; and,
(d) said bracket including adjustment means for adjusting the alignment of the X-ray tube with an object supported by said one analyzing device.

46. In a non-destructive X-ray analyzing mechanism including relatively rotatable theta and two-theta members rotatably mounted in a housing, the combination of:
(a) a housed X-ray tube adapted to emit a beam of X-rays;
(b) support means securing the tube to the housing; and,
(c) said support means including:
(i) a spherical bearing interposed between the tube and the housing so that the tube is angularly positionable relative to the housing;
(ii) means for adjusting the angle of the tube relative to the housing; and,
(iii) means to adjust translation of the tube relative to the housing.

47. In a non-destructive X-ray analyzing mechanism having first and second support members rotatably mounted in a housing for relative angular rotation, a drive system mounted in the housing for selectively motivating the support members, said drive system comprising:
(a) first and second power means;
(b) drive means operatively connecting the first power means to the first support member;
(c) differential means having first and second input shaft means operatively connected to said first and second power means respectively and an output shaft means operatively connected to said second support member, said output shaft means being rotatable at a speed which is a predetermined resultant of the speeds of said first and second input shaft means so that rotation of said support members is obtained by selective operation of one or both of said power means and the other of said power means acts as a brake when only one of such power means is operative.

48. The X-ray analyzing mechanism of claim 47 wherein at least one of the power means is reversible.

References Cited by the Examiner

UNITED STATES PATENTS

| | | | |
|---|---|---|---|
| 2,453,798 | 11/1948 | Kloos | 250—51.5 X |
| 2,805,341 | 9/1957 | Lang | 250—51.5 |
| 2,805,343 | 9/1957 | Lang | 250—51.5 |
| 2,826,083 | 3/1958 | Archbold | 74—70 |
| 2,870,337 | 1/1959 | Neff | 250—51.5 |
| 2,939,007 | 5/1960 | Keesaer | 250—51.5 X |
| 3,051,834 | 8/1962 | Shimula et al. | 250—51.5 |

OTHER REFERENCES

X-Ray Diffraction Procedures," by Klug and Alexander, 1954, pp. 244–245.

RALPH G. NILSON, *Primary Examiner.*